(12) United States Patent
Burrow et al.

(10) Patent No.: US 12,735,195 B2
(45) Date of Patent: Sep. 15, 2026

(54) AIRCRAFT CONTROL SURFACE ELEMENT MONITORING SYSTEM

(71) Applicant: Moog Wolverhampton Limited, Wolverhampton (GB)

(72) Inventors: Stephen George Burrow, Bristol (GB); Lindsay Roger Clare, Clevedon (GB)

(73) Assignee: Moog Wolverhampton Limited, Wolverhampton (GB)

( * ) Notice: Subject to any disclaimer, the term of this patent is extended or adjusted under 35 U.S.C. 154(b) by 239 days.

(21) Appl. No.: 18/697,528

(22) PCT Filed: Sep. 20, 2022

(86) PCT No.: PCT/EP2022/076011
§ 371 (c)(1),
(2) Date: Apr. 1, 2024

(87) PCT Pub. No.: WO2023/057198
PCT Pub. Date: Apr. 13, 2023

(65) Prior Publication Data

US 2024/0410720 A1 Dec. 12, 2024

(30) Foreign Application Priority Data

Oct. 7, 2021 (GB) ...................................... 2114354

(51) Int. Cl.
*B64D 45/00* (2006.01)
*B64F 5/60* (2017.01)
(Continued)

(52) U.S. Cl.
CPC ............ *B64D 45/0005* (2013.01); *B64F 5/60* (2017.01); *G01D 5/204* (2013.01); *G01M 13/023* (2013.01)

(58) Field of Classification Search
CPC .......... B64D 45/0005; B64D 2045/001; B64C 13/24; B64C 13/26; H02J 50/10;
(Continued)

(56) References Cited

U.S. PATENT DOCUMENTS 5,680,124 A 10/1997 Bedell et al.
5,686,907 A 11/1997 Bedell et al.
(Continued)

FOREIGN PATENT DOCUMENTS

CN 206775245 U 12/2017
EP 1029784 A1 8/2000
(Continued)

OTHER PUBLICATIONS

REA, 1993, "Boeing 777 High Lift Control System", IEEE AES Systems Magazine: 15-21.
(Continued)

*Primary Examiner* — Steven L Yeninas
(74) *Attorney, Agent, or Firm* — Harter Secrest & Emery LLP

(57) ABSTRACT

A signal transmitter apparatus configured for use in an aircraft moveable element monitoring system. The signal transmitter apparatus comprising a signal transmitter circuit. The signal transmitter circuit comprises: a first electrical path between a voltage input and a first node, the first electrical path comprising an inductor; a second electrical path between the first node and a second node, the second electrical path comprising a signal transmitter coil and a first capacitor, wherein the signal transmitter coil is electrically connected in series with the first capacitor; a third electrical path between the first node and the second node, the third electrical path comprising a second capacitor, such that the second capacitor is electrically connected in parallel to the signal transmitter coil and the first capacitor; and a fourth (Continued)

electrical path between the second node and the voltage input.

12 Claims, 7 Drawing Sheets

(51) Int. Cl.
*G01D 5/20* (2006.01)
*G01M 13/023* (2019.01)

(58) Field of Classification Search
CPC .. H02J 50/12; H04B 5/24; H04B 5/26; H04B 5/263
USPC .......................................................... 244/194
See application file for complete search history.

(56) References Cited

U.S. PATENT DOCUMENTS 5,743,490 A 4/1998 Gillingham et al.
5,869,986 A * 2/1999 Haque ...................... H03D 1/10 455/226.2
5,875,818 A 3/1999 Takats et al.
6,215,226 B1 * 4/2001 Durkee ............... G01F 23/2968 310/319
6,382,566 B1 5/2002 Ferrel et al.
6,867,696 B2 3/2005 Becken
6,930,489 B2 8/2005 Schievelbusch et al.
7,708,226 B2 5/2010 Schievelbusch
7,945,425 B2 5/2011 Marx et al.
8,115,649 B2 2/2012 Moy et al.
8,646,346 B2 2/2014 Hubberstey et al.
9,073,643 B2 7/2015 Moy et al.
9,656,764 B2 5/2017 Jones
9,887,037 B2 * 2/2018 Lee .......................... H04B 5/79
10,988,238 B2 4/2021 Schlipf et al.
11,015,665 B2 5/2021 Ankney et al.
2009/0212977 A1 8/2009 Pohl
2013/0327014 A1 12/2013 Moulebhar
2015/0015197 A1 1/2015 Mi et al.
2017/0073082 A1 3/2017 Ungar et al.
2017/0158348 A1 6/2017 Teubner
2018/0111697 A1 4/2018 Jones
2018/0180446 A1 6/2018 Smith
2018/0319483 A1 11/2018 Mayer et al.
2019/0210712 A1 * 7/2019 Schlipf ................... B64C 13/50
2020/0385106 A1 12/2020 Schoppe
2021/0261269 A1 8/2021 Thomas
2022/0009786 A1 1/2022 Hintemann et al.
2022/0097866 A1 * 3/2022 Whitehouse ....... B64D 45/0005
2023/0009325 A1 * 1/2023 Lee ......................... H02J 50/12

FOREIGN PATENT DOCUMENTS

EP 2322431 B1 8/2013
EP 2555979 B1 6/2016
EP 3505451 A1 7/2019
JP 5004224 B2 8/2012
KR 20110027208 A 3/2011
WO 2007065622 A1 6/2007
WO 2012085546 A1 6/2012
WO 2015006673 A1 1/2015
WO 2016093905 A1 6/2016
WO 2019096358 A2 5/2019
WO 2020144221 A1 7/2020

OTHER PUBLICATIONS

Energies, vol. 9, 2015, Zhenshi Wang et al, “Design and Control of a 3kW Wireless Power Transfer System for Electric Vehicles”, p. 10, figures 2, 6.

* cited by examiner

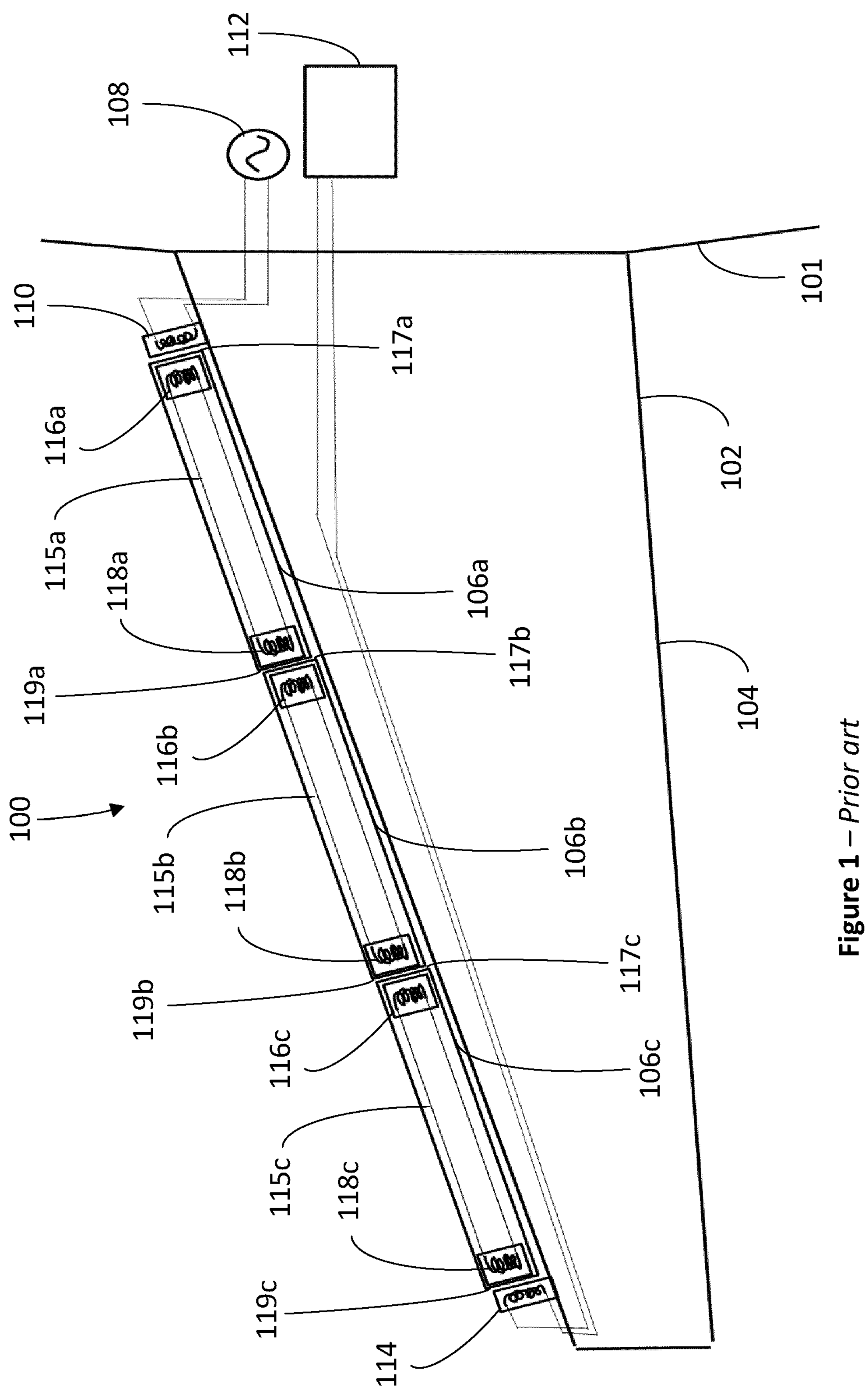
Figure 1 – *Prior art*

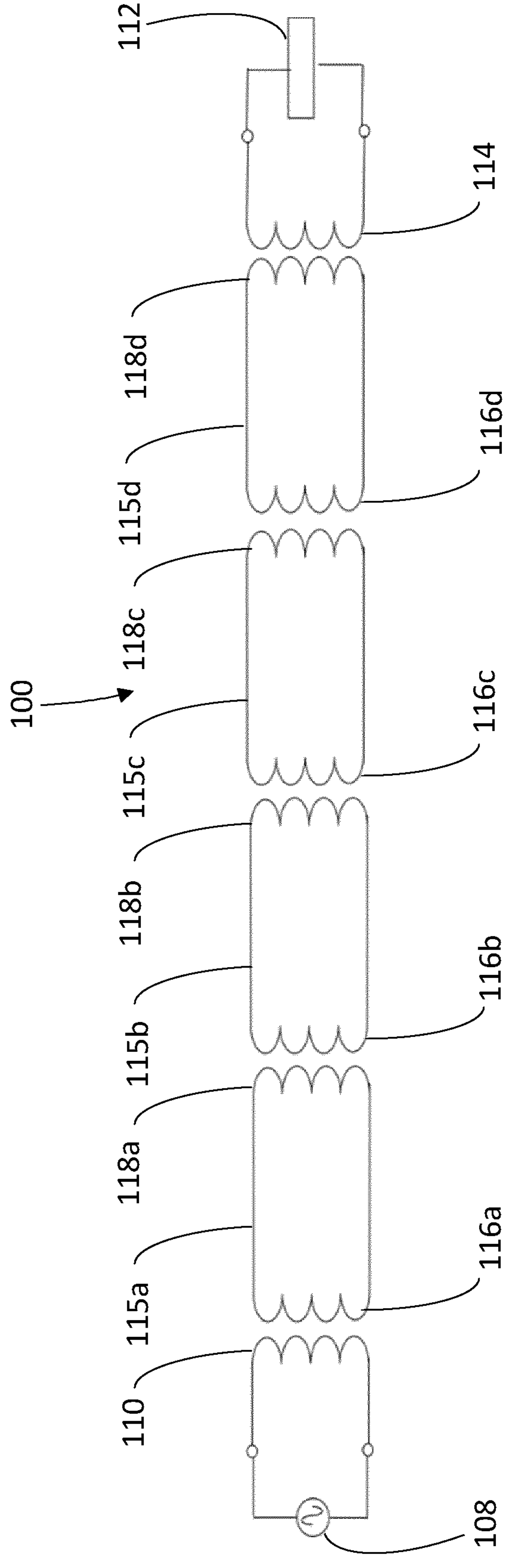
Figure 2 – *Prior art*

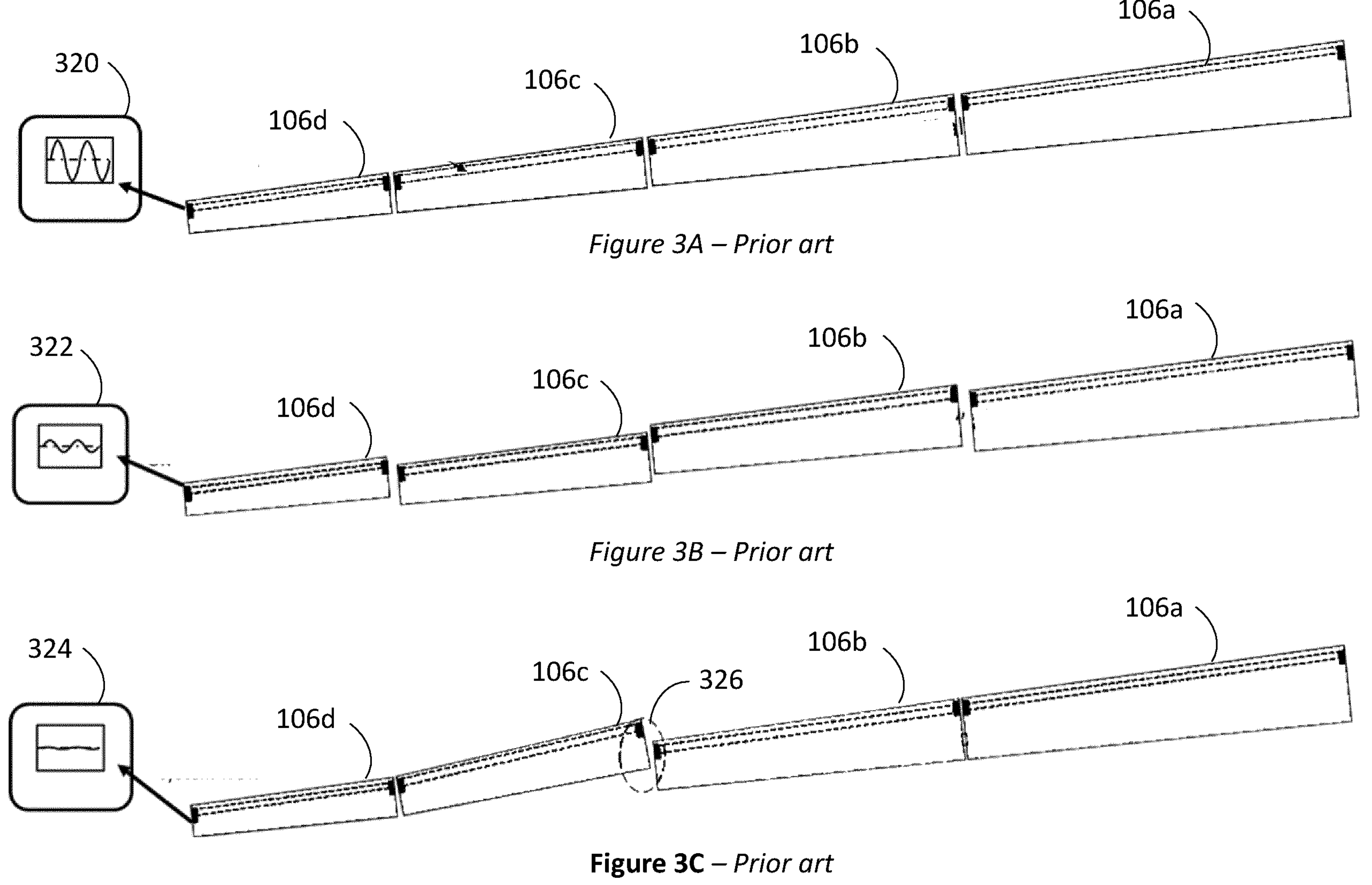
*Figure 3A – Prior art*
*Figure 3B – Prior art*
Figure 3C – *Prior art*

AIRCRAFT CONTROL SURFACE ELEMENT MONITORING SYSTEM

TECHNICAL FIELD

The present disclosure relates generally to a control surface skew and/or loss detection system. More specifically, the present disclosure relates to a wireless skew and/or loss detection system for use in chains of actuable aircraft parts, such as the slats and flaps of aircraft wing structures.

BACKGROUND

Aircraft wings typically comprise a series of actuable control surface elements. These control surface elements are moveable relative to the fixed wing structure in order to alter the aerodynamic characteristics of the wing. Such control surface elements include leading edge devices such as slats, and trailing edge devices such as flaps.

Typically, control surface elements such as flaps and slats are actuated at either of their span-wise ends by two separate actuators. It is conceivable that either of these actuators could fail, thus resulting in inconsistent actuation and skew or loss of the relevant control surface. It is important that this skew or loss be detected, and the relevant systems shut down and the pilot of the aircraft notified.

Patent publication WO2020/144221 A1 describes an aircraft moveable element monitoring system, using inductive coupling to detect skew and loss of moveable elements such as slats, flaps, and Kruger Flaps. More particularly, the aircraft moveable element monitoring system includes a signal generator, a signal transmitter coil electrically connected to the signal generator, a signal detector, a signal receiver coil electrically connected to the signal detector, and one or more moveable element signal transmission units. Each moveable element signal transmission unit comprises a first signal transmission unit coil and a second signal transmission unit coil, the first signal transmission unit coil being electrically connected to the second signal transmission unit coil. Each moveable element signal transmission unit is configured to be installed on a respective moveable element of an aircraft. The signal transmitter coil, the one or more moveable element signal transmission units and the signal receiver coil form an inductively coupled transmission line. For example, each coil in the system is configured to be proximate to another coil under normal (e.g. no skew/loss) conditions, such that a series of pairs of inductively coupled coils are provided, across which an electrical signal can be transmitted. The signal generator is configured to provide an electrical signal to the signal transmitter coil and the signal detector is configured to detect the electrical signal (e.g. after having been transmitted across one or more moveable element signal transmission unit) via the signal receiver coil. The signal detector is further configured to determine a condition (e.g. whether there is no misalignment/misalignment within acceptable operating parameters, or if there is unacceptable misalignment, such as skew or loss of a moveable element) of the one or more moveable elements by comparing the detected electrical signal to a predetermined signal characteristic/value (for example, comparing the detected signal strength to a predetermined threshold or value and/or monitoring the detected signal for occurrence of a characteristic property).

Patent application EP 3505451 A1 relates to a flight control surface assembly comprising electrical components at gaps between surfaces, wherein electrical energy is transferred across the gaps. A detection circuit detects whether received electrical energy is below a threshold and, if it is, controls a drive unit to stop movement of the flight control surfaces.

SUMMARY

The present disclosure provides for a signal (a monitoring signal) transmitter apparatus configured to be used in an aircraft moveable element monitoring system, the signal transmitter apparatus comprising a signal transmitter circuit. The signal transmitter circuit comprises: a first electrical path between a voltage input and a first node, the first electrical path comprising an inductor; a second electrical path between the first node and a second node, the second electrical path comprising a signal transmitter coil and a first capacitor, wherein the signal transmitter coil is electrically connected in series with the first capacitor; a third electrical path between the first node and the second node, the third electrical path comprising a second capacitor, such that the second capacitor is electrically connected in parallel to the signal transmitter coil and the first capacitor; and a fourth electrical path between the second node and the voltage input.

Advantageously, this arrangement provides a resonant circuit, wherein a current waveform having a substantially constant magnitude can be maintained across the signal transmitter coil, even when the moveable elements undergo small differences in separation during normal operation. Additionally, energy transfer across the aircraft moveable element monitoring system is improved, as is the signal to noise ratio of transmitted signals.

In some embodiments, the signal transmitter apparatus further includes a signal generator comprising: a connection to an aircraft DC voltage supply; an H-bridge configured to controllably connect the connection to the aircraft DC voltage supply to the voltage input; and an H-bridge driver circuit configured to control the H-bridge so as to provide a time varying voltage signal to the voltage input. Beneficially, this enables the leveraging of existing aircraft DC supplies to provide a suitable drive signal, moreover in a manner leading to low electromagnetic emissions. Optionally the H-bridge driver circuit is configured to control the H-bridge to selectively connect the connection to the aircraft DC voltage supply to the voltage input such that the varying voltage signal is a substantially square wave voltage signal. Preferably the H-bridge is configured to drive the signal transmitter coil at resonance, wherein the angular frequency, ω, of the substantially square wave voltage signal satisfies the conditions $$\omega = \sqrt{\frac{1}{L_1 C_1}} \text{ and } \omega = \sqrt{\frac{1}{L_P}\left(\frac{1}{C_1} + \frac{1}{C_2}\right)},$$

where $L_1$ is the inductance of the inductor, $L_P$ is the inductance of the signal transmitter coil, $C_1$ is the capacitance of the second capacitor, and $C_2$ is the capacitance of the first capacitor.

In another aspect of the present invention, there is provided an aircraft moveable element monitoring system comprising: the signal transmitter apparatus above, a signal detector, a signal receiver coil electrically connected to the signal detector, and one or more moveable element signal transmission units. Each moveable element signal transmission unit comprises a first signal transmission unit coil and a second signal transmission unit coil, the first signal transmission unit coil being electrically connected to the second signal transmission unit coil. Each moveable element signal transmission unit is configured to be installed on a respective moveable element of an aircraft, such that the signal transmitter coil, the one or more moveable element signal transmission units and the signal receiver coil form an inductively coupled transmission line.

Preferably, each moveable element signal transmission unit comprises a tuning capacitor, thereby enabling each moveable element signal transmission unit to be tuned to the resonant frequency of the signal transmitter circuit, advantageously improving signal transfer across the aircraft moveable element monitoring system.

Optionally, the signal detector comprises a third capacitor and an envelope detector, wherein the third capacitor and the envelope detector are each electrically connected in parallel to the signal receiver coil. Beneficially, this arrangement provides a tuned detection circuit for monitoring the amplitude of the received signal. Optionally the envelope detector further comprises a unity-gain buffer.

Optionally the signal detector comprises an analogue phase comparator configured to measure a phase difference between the time varying voltage signal and a received signal received by the signal detector via the signal receiver coil; or a microprocessor configured to measure a phase difference between the time varying voltage signal and a received signal received by the signal detector via the signal receiver coil.

In another aspect of the present invention, there is provided an aircraft moveable element monitoring system comprising: a signal generator; a signal transmitter coil electrically connected to the signal generator; a signal detector; a signal receiver coil electrically connected to the signal detector; and one or more moveable element signal transmission units. The signal detector comprises a third capacitor and an envelope detector, wherein the third capacitor and the envelope detector are each electrically connected in parallel to the signal receiver coil. Each moveable element signal transmission unit comprises a first signal transmission unit coil and a second signal transmission unit coil, the first signal transmission unit coil being electrically connected to the second signal transmission unit coil. Each moveable element signal transmission unit is configured to be installed on a respective moveable element of an aircraft, such that the signal transmitter coil, the one or more moveable element signal transmission units and the signal receiver coil form an inductively coupled transmission line. Optionally the envelope detector further comprises a unity-gain buffer. Optionally the signal detector further comprises: an analogue phase comparator configured to measure a phase difference between a time varying voltage signal and a received signal received by the signal detector via the signal receiver coil; or a microprocessor configured to measure a phase difference between the time varying voltage signal and a received signal received by the signal detector via the signal receiver coil.

In a further aspect of the present invention, there is provided an aircraft comprising a moveable element monitoring system as discussed above.

BRIEF DESCRIPTION OF THE DRAWINGS

The accompanying drawings are incorporated herein as part of the specification. The drawings described herein illustrate embodiments of the present disclosure and are illustrative of selected principles and teachings thereof. However, the drawings do not illustrate all possible implementations of the presently disclosed subject matter and are not intended to limit the scope of the present disclosure in any way.

FIG. 1 shows a schematic cross section of an aircraft wing including a prior art control surface element monitoring system.

FIG. 2 shows a schematic of the prior art control surface element monitoring system of FIG. 1.

FIGS. 3A-3C show schematic cross sections of an aircraft wing including the prior art control surface element monitoring system of FIG. 1 under different conditions.

DETAILED DESCRIPTION

Figure 4A:
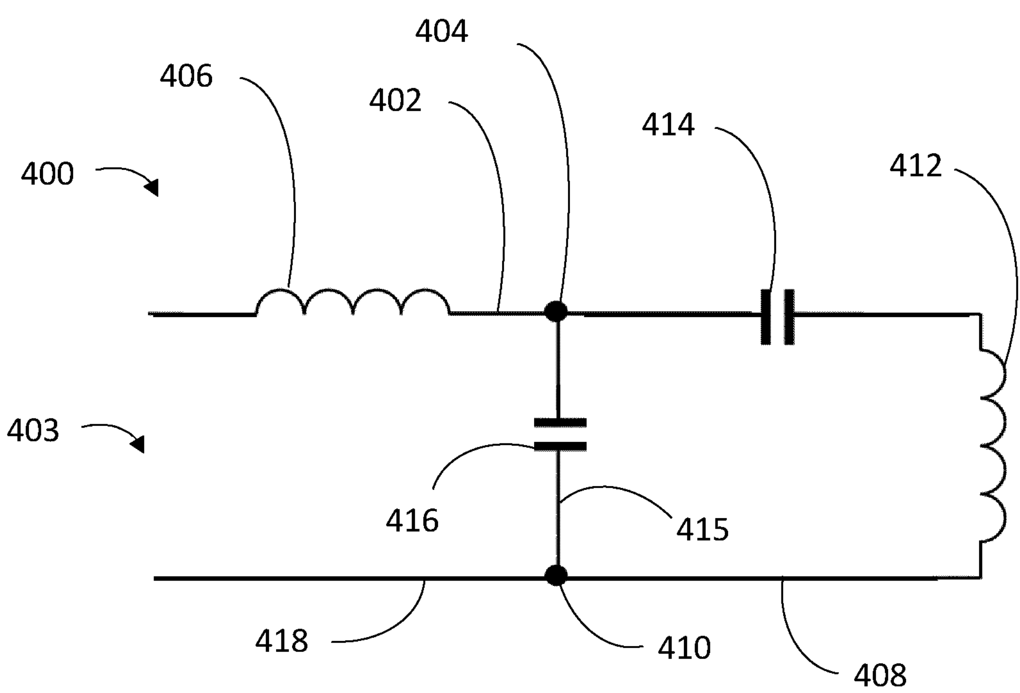
FIG. 4A shows a schematic circuit diagram of a signal transmitter circuit for use in an aircraft moveable element monitoring system in accordance with an embodiment of the present invention.

It is to be understood that the invention may assume various alternative orientations and step sequences, except where expressly specified to the contrary. It is also to be understood that the specific assemblies and systems illustrated in the attached drawings and described in the following specification are simply exemplary embodiments. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

In the embodiments described below, the invention is described in relation to the detection of skew and/or loss of control surface elements. The present disclosure is applicable to a sequence/chain of high lift leading edge and trailing edge control surface elements, including slats, Krueger Flaps, and flaps. However, it will be appreciated that the principles described herein are also applicable to detecting misalignment, skew and/or loss of any sequence/chain of moveable/actuable aircraft parts.

FIG. 1 shows a schematic representation of part of an aircraft including a prior art control surface element monitoring system 100 as described in detail in patent publication WO2020/144221 A1. FIG. 1 shows a portion of an aircraft fuselage 101, and an aircraft wing structure 102 comprising a fixed part 104 and a chain/sequence of moveable control surface elements 106*a*, 106*b*, 106*c*. The moveable control surface elements 106*a*, 106*b*, 106*c* may be, but are not limited to, a sequence/chain of slats, flaps, and/or Krueger Flap devices. As shown in the example of FIG. 1, the wing structure 102 has three control surface elements 106*a*, 106*b*, 106*c*, however any suitable number of control surface elements (just one or more than one) can be provided in the control surface element monitoring system 100, depending on the function of the control surface elements, the size of the aircraft, etc. The control surface elements 106*a*, 106*b*, 106*c* are optionally disposed on either the leading or trailing edge of the wing structure 102. Each control surface element 106*a*, 106*b*, 106*c* is configured to move relative to the fixed part 104. In one example, the control surface elements 106*a*, 106*b*, 106*c* are slats, Krueger Flaps, or flaps. In an embodiment, in the case of the control surface elements 106*a*, 106*b*, 106*c* being slats, they may be actuated via a rack and pinion arrangement connected to a torque shaft, the torque shaft being rotatably connected to the fixed part 104 and driven by a power drive unit (PDU) located in the fuselage 101.

The control surface element monitoring system 100 includes a signal generator 108 electrically connected to a signal transmitter coil 110. In an embodiment, the signal generator 108 and signal transmitter coil 110 are disposed on the fixed part 104 as shown in FIG. 1—advantageously, this avoids the need for any wired connections that might be required by the signal generator 108 (for example power, data and/or control cables) to cross a gap between the main body of the wing structure 102 and a control surface element 106*a*, 106*b*, 106*c*. In another embodiment, one or both of the signal generator 108 and signal transmitter coil 110 are instead disposed within a further control surface element. The signal generator 108 is configured to produce a time varying AC or DC output monitoring signal. The signal transmitter coil 110 may be an antenna comprising an inductor.

The control surface element monitoring system 100 also includes a signal detector 112 electrically connected to a signal receiver coil 114. In an embodiment, at least the signal detector 112 is either part of a central computing unit, or communicatively connected to a separate central computing unit within the aircraft. The signal detector 112 and signal receiver coil 114 may be disposed on the fixed part 104 as shown in FIG. 1. Alternatively, one or both of the signal detector 112 and signal receiver coil 114 are instead disposed within a further control surface element. The signal receiver coil 114 may be an antenna comprising an inductor.

The control surface element monitoring system 100 also comprises control surface element signal transmission units 115*a*, 115*b*, 115*c* comprising a first signal transmission unit coil 116*a*, 116*b*, 116*c* and a second signal transmission unit coil 118*a*, 118*b*, 118*c*. Each first signal transmission unit coil 116*a*, 116*b*, 116*c* is electrically connected to the corresponding second signal transmission unit coil 118*a*, 118*b*, 118*c* within the corresponding control surface element 106*a*, 106*b*, 106*c* (for example, by providing wired connections between corresponding ends of the first signal transmission unit coil 116*a*, 116*b*, 116*c* and the second signal transmission unit coil 118*a*, 118*b*, 118*c* within each control surface element signal transmission units 115*a*, 115*b*, 115*c*). The first signal transmission unit coil 116*a*, 116*b*, 116*c* and/or the second signal transmission unit coil 118*a*, 118*b*, 118*c* may be an antenna comprising an inductor.

Each of the control surface elements 106*a*, 106*b*, 106*c* includes a corresponding control surface element signal transmission unit 115*a*, 115*b*, 115*c*. The signal transmission units 115*a*, 115*b*, 115*c* comprise electronic modules configured to be positioned within one or more respective moveable elements to transmit an electrical signal across the one or more moveable elements. As shown in FIG. 1, the first and second signal transmission unit coils 116*a*, 116*b*, 116*c*, 118*a*, 118*b*, 118*c* are positioned such that, in the presence of an electrical current, when the control surface elements 106*a*, 106*b*, 106*c* are not in a skew/loss condition, each first and second signal transmission unit coil 118*a*, 118*b*, 118*c*, 118*a*, 118*b*, 118*c* is inductively coupled to another coil. The control surface element monitoring system 100 comprises no wires running across the gaps between adjacent control surface elements 106*a*, 106*b*, 106*c*, and between control surface elements 106*a*, 106*b*, 106*c* and the fixed part 104.

The first signal transmission unit coil 116*a*, 116*b*, 116*c* of each control surface element signal transmission unit 115*a*, 115*b*, 115*c* is positioned proximate to a first lateral edge 117*a*, 117*b*, 117*c* of the corresponding control surface element 106*a*, 106*b*, 106*c*. Similarly, the second signal transmission unit coil 118*a*, 118*b*, 118*c* is positioned proximate to a second lateral edge 119*a*, 119*b*, 119*c* of the corresponding control surface element 106*a*, 106*b*, 106*c*, the second lateral edge 119*a*, 119*b*, 119*c* opposing the first lateral edge 117*a*, 117*b*, 117*c*. This allows the first signal transmission unit coil 116*a*, 116*b*, 116*c* of each control surface element signal transmission unit 115*a*, 115*b*, 115*c* to be inductively coupled with the second signal transmission unit coil 118*a*, 118*b*, 118*c* of a different control surface element signal transmission unit 115*a*, 115*b*, 115*c* installed on an adjacent control surface element 106*a*, 106*b*, 106*c*. For example, as shown in FIG. 1, first signal transmission unit coil 116*c* of control surface element signal transmission unit 115*c* is inductively coupled with second signal transmission unit coil 118*b* of control surface element signal transmission unit 115*b*.

The control surface element signal transmission units 115*a*, 115*c* in the endmost control surface elements 106*a*, 106*c* in the chain/sequence, inductively couple to either the signal transmitter coil 110 or the signal receiver coil 114. As shown in FIG. 1, the signal transmitter coil 110 is positioned on the fixed part 104 at a location proximate to the first lateral edge 117*a* of a first control surface element 106*a* in the chain. Similarly, the signal receiver coil 114 is positioned on the fixed part 104 at a location proximate to the second lateral edge 119*c* of a last control surface element 106*c* in the chain. In this way the signal transmitter coil 110 is inductively coupled to the first signal transmission unit coil 116*a* in the first control surface element 106*a*, and the signal receiver coil 114 is inductively coupled to the second signal transmission unit coil 118*c* in the last control surface element 106*c*.

In this manner, the signal transmitter coil 110, the one or more control surface element signal transmission units 115*a*, 115*b*, 115*c* and the signal receiver coil 114 form an inductively coupled transmission line.

In use, the signal generator 108 generates a time-varying electrical signal, for example a sinusoidal voltage signal. The signal is provided to the transmitter coil 110. In the event that the control surface elements 106*a*, 106*b*, 106*c* are in a normal configuration (i.e. no control surface element is missing 106*a*, 106*b*, 106*c*, and there is no unacceptably high level of skew between control surface elements 106*a*, 106*b*, 106*c*), then the signal is transmitted to the signal detector 112 by means of the inductive coupling between the signal transmitter coil 110 and the first signal transmission unit coil 116*a* of the first control surface 106*a*, between successive corresponding second signal transmission unit coils 118*a*, 118*b* and first signal transmission unit coils 116*b*, 116*c*, and between the second signal transmission unit coil 118*c* of a last control surface element 106*c* and the signal receiver coil

114. In this normal condition, the signal as received by the detector 112 has a relatively high strength (e.g. a relatively high peak voltage).

In the event of an unacceptable skew of one of the control surface elements 106*a*, 106*b*, 106*c* one or both of the first signal transmission unit coil 116*a*, 116*b*, 116*c* and the second signal transmission unit coil 118*a*, 118*b*, 118*c* in that control surface element becomes misaligned with respect to a next coil in the chain/sequence (for example, the first signal transmission unit coil/second signal transmission unit coil in an adjacent control surface element, or the signal transmitter coil 110 or receiver coil 114). At such a misalignment, the inductive coupling between coils is reduced. As a result, the signal as received by the detector 112 has a relatively low strength (e.g. a relatively low peak voltage), or potentially no signal is received by the detector 112 at all. Other properties of the signal as received by the detector 112 may also change as a result of the reduced inductive coupling between coils, such as, but not limited to, the phase of the signal.

A relatively low received signal strength or no received signal would also occur in the event that one of the control surface elements 106*a*, 106*b*, 106*c* was missing, or had failed to actuate or actuated unexpectedly (in the case that the sequence of control surface elements 106*a*, 106*b*, 106*c* were independently actuated). Similarly, any form of misalignment between control surface elements 106*a*, 106*b*, 106*c* (e.g. skew, damage, deformation, etc.), would also result in a relatively low received signal strength or no received signal at the detector 112.

Accordingly, the signal as detected at the detector 112 is used to determine whether the chain of control surface elements 106*a*, 106*b*, 106*c*, is in a normal condition or if at least one of the control surface elements 106*a*, 106*b*, 106*c* is misaligned (e.g. in a skew condition or otherwise misaligned), has been lost, or has otherwise not actuated deployed as expected. In some embodiments, the monitoring signal strength is compared to a predetermined threshold value indicative of a maximum acceptable skew within the control surface element monitoring system 100 (for example, the peak voltage or peak root mean squared "RMS" voltage can be compared to a threshold value)—if the threshold is not exceeded, then it is determined that unacceptable skew and/or loss of one or more control surface elements 106*a*, 106*b*, 106*c* has occurred. Alternatively, other characteristic properties of the signal, such as a signal profile over time or a phase of the monitoring signal at the signal detector 112, can be compared to predetermined signal characteristics (e.g. one or more threshold values, a predetermined voltage profile over time, an original phase of the signal as produced by the signal generator 108, etc.), wherein the comparison indicates whether the signal as received at the detector 112 is as expected for a normal configuration, or whether skew/loss of a control surface element 106*a*, 106*b*, 106*c* has occurred.

FIG. 2 shows a schematic representation of electronic components in the prior art control surface element monitoring system 100 of FIG. 1, and as described in detail in patent publication WO2020/144221 A1. The control surface element monitoring system 100 includes the signal generator 108, signal transmission coil 110, first signal transmission unit coils 116*a*, 116*b*, 116*c*, second signal transmission unit coils 118*a*, 118*b*, 118*c*, receiver coil 114 and signal detector 112. FIG. 2A shows an additional control surface element signal transmission unit 115*d* corresponding to an additional control surface element 106 in the sequence, including a first signal transmission unit coil 116*d* and a second signal transmission unit coil 118*d*. As noted above, any suitable number of control surface elements 106 (one or more) can be provided in the system 100, depending on the function of the control surface elements 106, the size of the aircraft, etc. Optionally a capacitor and a resistor are included in each of the control surface element signal transmission units 115*a*, 115*b*, 115*c*, 115*d*.

FIGS. 3A-C show schematic cross sections of an aircraft wing as described in detail in patent publication WO2020/144221 A1, including the control surface element monitoring system 100, 200 under different conditions. FIG. 3 shows four control surface elements 106*a*, 106*b*, 106*c*, 106*d*, though a different number may alternatively be provided. The situation shown in FIGS. 3A-C may correspond to any particular degree of actuation of the control surface elements 106*a*, 106*b*, 106*c*, 106*d*. For example, the control surface elements 106*a*, 106*b*, 106*c*, 106*d* may be in a fully retracted configuration, a fully extended configuration, or an intermediate configuration. Other elements of the system 100, 200 (such as the signal transmitter coil 110 and the signal receiver coil 114, etc.) have been omitted from FIGS. 3A-C in the interest of clarity of explanation.

In FIG. 3A, all control surface elements 106*a*, 106*b*, 106*c*, 106*d* are in perfect alignment. No control surface element 106 is missing, nor is there any skew or other misalignment between adjacent control surface elements 106. This represents an ideal case. In this case, there is good coupling between the signal transmitter coil 110, the signal transmission units 115*a*, 115*b*, 115*c*, 115*d* and the signal receiver coil 114, resulting in a relatively strong monitoring signal 320 being detected at the detector 112.

In FIG. 3B, the control surface elements 106*a*, 106*b*, 106*c*, 106*d* are not in perfect alignment, however the amount of misalignment is within acceptable operation parameters. In this case, the coupling between the signal transmitter coil 110, the signal transmission units 115*a*, 115*b*, 115*c*, 115*d* and the signal receiver coil 114 is not as good as in the ideal case, but is still sufficient to effectively transmit the electrical monitoring signal to the detector 112. In this case, the detected signal strength 322 is less than the ideal case, but may still satisfy an associated signal strength threshold indicating that any misalignment is within acceptable operation parameters.

Both the situations in FIGS. 3A and 3B can be considered "normal" conditions, in that they represent situations in which the alignment between control surface elements 106*a*, 106*b*, 106*c*, 106*d* is within acceptable operation parameters.

FIG. 3C shows the situation in which a skew condition has occurred. Two control surface elements 106*b*, 106*c* are misaligned relative to one another introducing a skew 326 between them. In this case, the coupling between the signal transmitter coil 110, the signal transmission units 115*a*, 115*b*, 115*c*, 115*d* and the signal receiver coil 114 is poor (i.e. worse than the coupling for any case in which misalignment is within acceptable operation parameters). In particular, the inductive coupling between the second signal transmission unit coil 118*b* of the second control surface element 106*b* in the sequence, and the first signal transmission unit coil 116*c* of the second control surface element 106*c* is reduced as compared to a normal condition.

In this case, the detected signal strength 324 is relatively low, and does not satisfy a signal strength threshold, thus indicating that there is misalignment that is not within acceptable operation parameters.

In the event that it is determined that unacceptable misalignment/loss of one or more control surface elements 106*a*, 106*b*, 106*c* has occurred (for example, if a skew is detected as shown in FIG. 3C), the detector 112 may be configured to provide an indication to a central computing unit within the aircraft, which in turn notifies the pilot and/or other relevant personnel of the skew/loss condition.

The present invention provides a signal transmitter apparatus configured to be used in a control surface element monitoring system of the type shown in FIGS. 1 to 3C and as described above. The present invention also provides a control surface element monitoring system including a signal transmitter apparatus. Embodiments further include control surface element signal transmission units and signal detectors configured for use with the signal transmitter apparatus.

FIG. 4A shows a schematic circuit diagram of a signal transmitter circuit 400 for use in an aircraft moveable element monitoring system in accordance with an embodiment of the present invention. The signal transmitter circuit 400 is configured to receive an input varying voltage signal from a signal generator (not shown) at voltage input 403, and to transmit a modified monitoring signal inductively from a signal transmitter coil 412 to a neighbouring first signal transmission unit coil (not shown).

The signal transmitter circuit 400 comprises an LCC circuit, wherein the signal transmitter coil 412 is connected in series with a first capacitor 414, and a second capacitor 416 is connected in parallel with the signal transmitter coil 412 and the first capacitor 414. An inductor 406 is connected between the voltage input 403 and the signal transmitter coil 412 and first and second capacitors 414, 416. Put differently: a first electrical path 402 is provided between the voltage input 403 and a first node 404, the first electrical path 402 comprising the inductor 406; a second electrical path 408 is provided between the first node 404 and a second node 410, the second electrical path 408 comprising the signal transmitter coil 412 and the first capacitor 414; a third electrical path 415 between the first node 404 and the second node 410, the third electrical path 415 comprising the second capacitor 416; and a fourth electrical path 418 is provided between the second node 410 and the voltage input 403.

Advantageously, use of an LCC circuit in conjunction with the signal transmitter coil 412 means that the signal transmitter circuit 400 exhibits resonant properties. During normal operation, the separation between neighbouring control surface elements (e.g. control surface elements 106*a*, 106*b*, 106*c*) may change slightly. For example, the gap between control surface elements, and/or the gap between an endmost control surface element and a fixed part of the aircraft wing, may be different when the control surface elements are extended than when they are in a retracted position. Similarly, changes in temperature, and the effect of air moving over the control surface elements may also change the separation slightly. These slight changes do not represent unacceptable misalignment or skew. In the present embodiment, when a time varying voltage is applied to the voltage input 403 at the resonant frequency of the signal transmitter circuit 400, the magnitude of the current (e.g. the RMS value of the current) passing through the signal transmitter coil 412 can be held substantially constant, even in the event of small changes in separation between the signal transmitter coil 412 and an adjacent first transmission unit coil (e.g. first transmission unit coil 115*a*). Specifically, by driving the signal transmitter circuit 400 at its resonant frequency, effects resulting from changes in the mutual induction, caused by changes in separation between the signal transmitter coil 412 and an adjacent first transmission unit coil, become negligible.

Thus the present arrangement provides the ability to drive the signal transmitter coil 412 at constant magnitude current, irrespective of small variations in separation between the signal transmitter coil 412 and an adjacent first transmission unit coil (e.g. first transmission unit coil 115*a*). This in turn provides further advantages. Firstly, it simplifies signal detection analysis by mitigating the effects of variable mutual induction in operation. Secondly, it allows the signal transmitter coil 412 to be driven constantly at its maximum current rating, thereby maximising energy transfer between the signal transmitter coil 412 and an adjacent first transmission unit coil. Thirdly, it improves the signal to noise ratio at the end of the signal chain, i.e. at the signal detector (e.g. the signal detector 112 described above).

An additional advantage of the arrangement of FIG. 4 is that the signal transmitter coil 412 current magnitude can be directly increased, (e.g. to increase signal to noise ratio), by increasing the magnitude of the voltage applied to the voltage input 403.

Figure 4B:
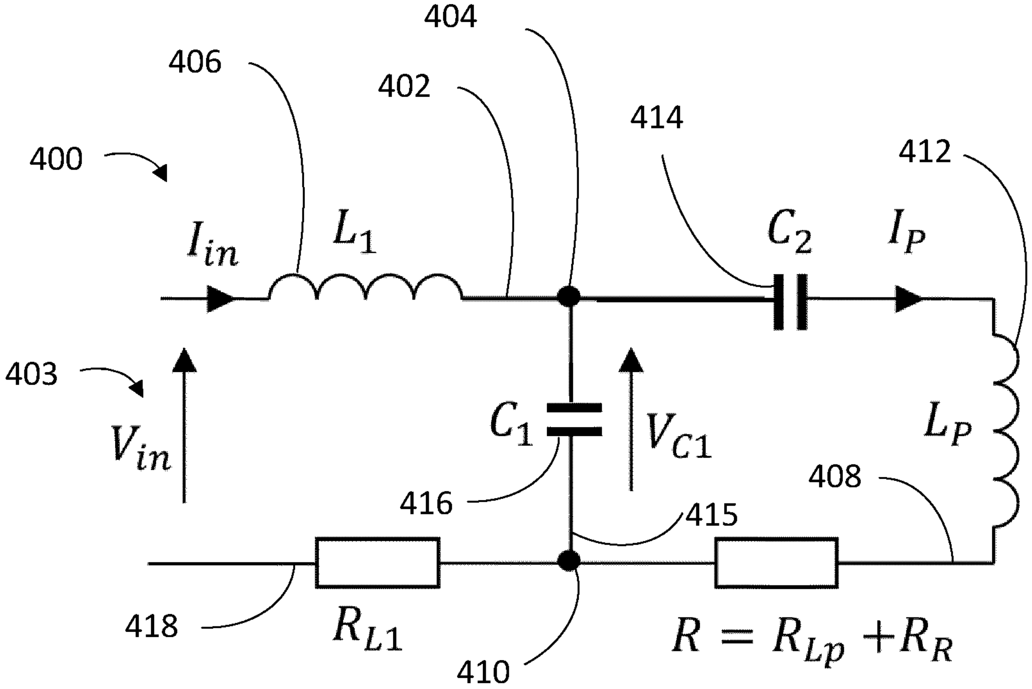
FIG. 4B shows an equivalent circuit diagram for an implementation of the signal transmitter circuit of FIG. 4A.

FIG. 4B shows an equivalent circuit that models the arrangement shown in FIG. 4B in operation. A time varying voltage Vin is applied to the voltage input 403, with a corresponding time varying current $I_{in}$. The inductor 406 has an inductance of value $L_2$ and produces a series resistance component of $R_{L1}$. The first capacitor 414 has a capacitance of $C_2$, and the second capacitor 416 has a capacitance of $C_1$, with a potential difference $V_{C2}$ over the second capacitor 416. The signal transmitter coil 412 has an inductance of $L_P$ and produces a series resistance component of $R_{Lp}$. The effects of reflected signals from the first signal transmission unit coil (for example the first signal transmission unit coil 116*a* described above) neighbouring the signal transmitter coil 412 can be modelled by a further series resistance $R_R$, giving a total effective series resistance for the signal transmitter coil 412 of $R=R_{Lp}+R_R$. The resistances of the first and second capacitors 414, 416 are small compared to $R_{Lp}$ and $R_L$, and are modelled as being negligible under resonant conditions. Under this model, the resonant angular frequency, $\omega_0$, of the signal transmitter circuit 400 is governed by equations (1) and (2) below:

$$\omega_0 = \sqrt{\frac{1}{L_1 C_1}} \tag{1}$$

$$\omega_0 = \sqrt{\frac{1}{L_P}\left(\frac{1}{C_1} + \frac{1}{C_2}\right)} \tag{2}$$

In one example, values of $L_2$, $C_2$, $C_2$, and $L_P$ are chosen such that the resonant angular frequency $\omega_0$ corresponds to a resonant frequency of between 10 and 100 kHz, and more preferably around 50 kHz. Advantageously, such a resonant frequency has been found to provide effective signal transfer over the size of gaps typically found between control surface elements such as slats. Moreover using a resonant frequency of between 10 and 100 kHz, preferably 50 Hz, reduces the risk of interference with radar and communications systems that may be present on the aircraft.

Figure 5A:
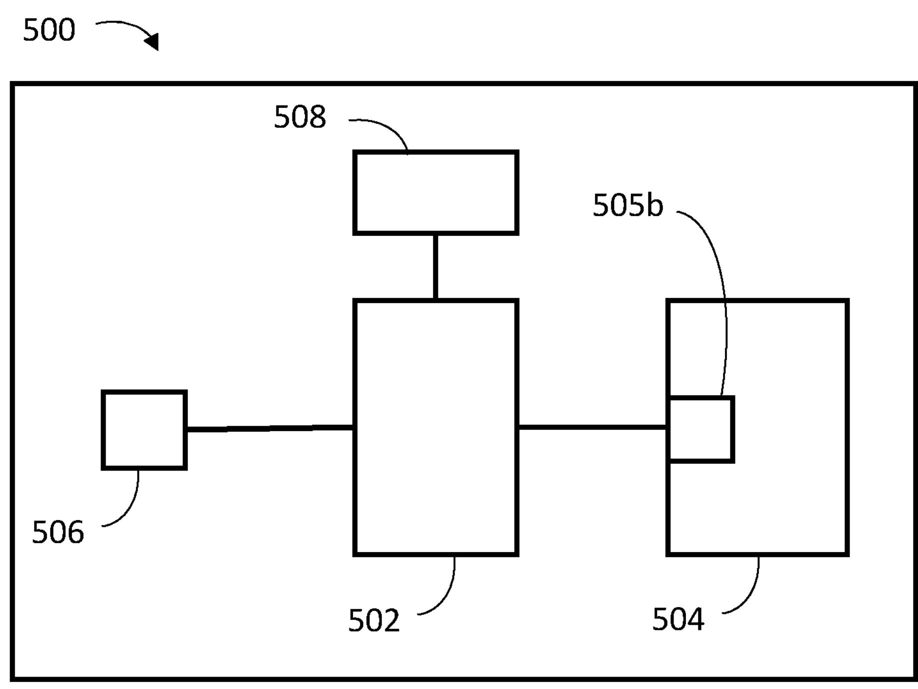
FIG. 5A shows a schematic signal transmitter apparatus for use in an aircraft moveable element monitoring system in accordance with an embodiment of the present invention.

FIG. 5A shows a schematic signal transmitter apparatus 500 for use in an aircraft moveable element monitoring system in accordance with an embodiment of the present invention. The signal transmitter apparatus 500 links a signal transmitter circuit 504 (for instance the signal transmitter circuit 400 of FIG. 4A as described above) to an DC voltage supply, preferably an existing voltage DC voltage supply.

Figure 5B:
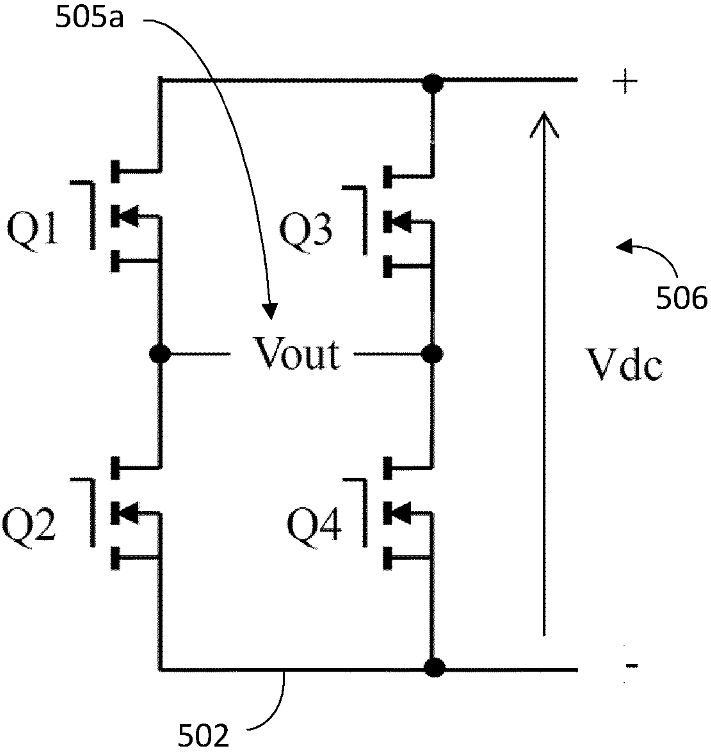
FIG. 5B shows an H-bridge for use in the signal transmitter apparatus of FIG. 5A, in accordance with an embodiment of the present invention.

The signal transmitter apparatus 500 includes an H-bridge 502 (shown in more detail in FIG. 5B), which is in electrical communication with a signal transmitter circuit 504 (e.g. signal transmitter circuit 400) and a connection 506 to an aircraft DC voltage supply. The H-bridge 502 is controlled by an H-bridge driver 508. The H-bridge controller 508 is preferably configured to cause the H-bridge 502 to selectively connect the aircraft DC voltage supply connection 506 to the voltage input 505*b* of the signal transmitter circuit 504 (e.g. the voltage input 403 of the signal transmitter circuit 400 described above) via a voltage output 505*a* of the H-bridge 502. In particular, the H-bridge controller 508 is preferably configured to cause the H-bridge 502 to provide a square wave time-varying voltage to the voltage input 505*b* of the signal transmitter circuit 504.

The H-bridge 502 thus provides a switched mode inverter, giving efficient production of the necessary alternating current with minimal power loss in switching. This further allows the use of pre-existing low voltage DC aircraft power supplies—no additional power source is required.

Preferably the signal transmitter circuit 504 is identical to the signal transmitter circuit 400 described in relation to FIG. 4A above. In this case, the square wave voltage output by the H-bridge 502 advantageously has an angular frequency substantially equal to the resonant angular frequency Wo. The LCC arrangement of the signal transmitter circuit 400 advantageously filters out high frequency components of the square wave voltage output by the H-bridge 502, producing a substantially sinusoidal time-varying current through the signal transmitter coil 412. Accordingly the signal transmitter apparatus 500 ultimately produces a substantially sinusoidal signal for propagation along the inductively coupled transmission line i.e. along signal transmission units (e.g. signal transmission units 115*a*, 115*b*, 115*c*, 115*d*) and the signal receiver coil (e.g. signal receiver coil 114). Beneficially, by filtering out high frequency components the risk of interference with other aircraft wireless systems (e.g. radar, communications systems) due electromagnetic emissions effects is further reduce.

Thus the use of the signal transmitter apparatus 500 using the signal transmitter circuit 400 not only provides the advantages described above in relation to the use of a time varying voltage at the resonant frequency, but does so in a particularly effective manner, leveraging existing low voltage DC aircraft power supplies in a simple manner that also reduces electromagnetic emissions effects. This arrangement can be used in place of the prior art signal generator 108 and signal transmission coil 110.

Figure 6:
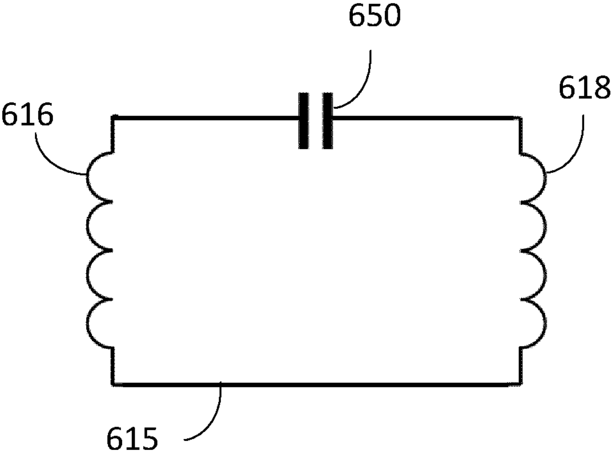
FIG. 6 shows a schematic circuit diagram of a moveable element signal transmission unit forming part of an aircraft moveable element monitoring system in accordance with an embodiment of the present invention.

FIG. 6 shows a schematic circuit diagram of a moveable element signal transmission unit 615 forming part of an aircraft moveable element monitoring system in accordance with an embodiment of the present invention. The moveable element signal transmission unit 615 is configured to be used in conjunction with the signal transmitter apparatus 500 including the signal transmitter circuit 400, for example in place of a signal transmission unit 115*a*, 115*b*, 115*c* as described above and known from the prior art.

The moveable element signal transmission unit 615 includes a first signal transmission unit coil 616 and a second signal transmission unit coil 618, as known in the art. The moveable element signal transmission unit 615 also includes a capacitor 650 in series with the first and second signal transmission unit coils 616, 618.

Advantageously, the presence of the capacitor 650 allows the moveable element signal transmission unit 615 to be tuned to the resonant angular frequency $\omega_0$ of the signal transmitter circuit 400. In particular, the capacitance of the capacitor 650 is chosen relative to the inductances of the first and second signal transmission unit coils 616, 618 such that the moveable element signal transmission unit 615 is resonant when the angular frequency of the signal received by the first signal transmission unit coil 616 from the signal transmitter coil 412 (or from a second signal transmission unit coil from an adjacent moveable element signal transmission unit, as applicable) is substantially the resonant angular frequency $\omega_0$ as defined above. By tuning the moveable element signal transmission unit 615 in this manner, the magnitude of the time-varying current induced in the moveable element signal transmission unit 615 is increased, ultimately increase the efficiency of signal transmission across the aircraft moveable element monitoring system.

Figure 7:
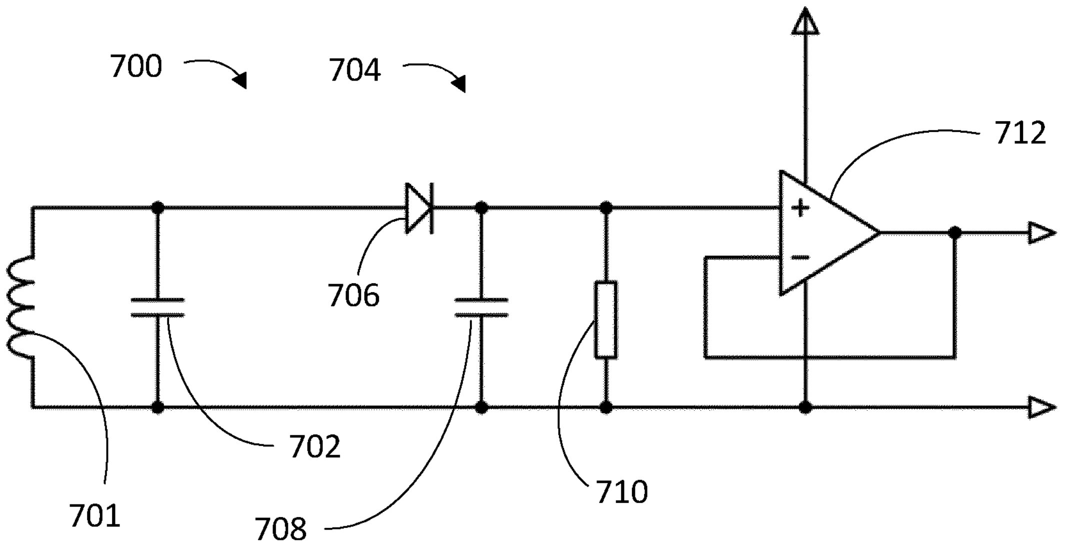
FIG. 7 shows a schematic circuit diagram of a signal receiver coil and signal detector forming part of an aircraft moveable element monitoring system in accordance with an embodiment of the present invention.

FIG. 7 shows a schematic circuit diagram of a signal receiver coil 701 and signal detector 700. Advantageously, this arrangement may optionally be used in an aircraft moveable element monitoring system employing the signal transmitter circuit 400 and optionally the signal transmitter apparatus 500 and/or the control surface element signal transmission unit 615 described above in relation to FIGS. 4A to 6 respectively.

The signal detector 700 includes a capacitor 702 connected in parallel with a signal receiver coil 701 (such as the signal receiver coil 114 described above). The signal detector 700 also includes an envelope detector 704 connected in parallel with the capacitor 702 and with the signal receiver coil 701. Any envelope detector as known in the art may be used, for example that shown in FIG. 7 comprising a diode 706, a further capacitor 708, a resistor 710 and a unity-gain buffer 712.

Advantageously, the capacitor 702 is used (in combination with the signal receiver coil 701) to tune the signal detector to the resonant angular frequency $\omega_0$, again increasing the current induced by the received signal and enhancing monitoring signal detection.

The diode 706 and the resistor 710 form a half wave rectifier and, in combination with the further capacitor 708, form an envelope detector. The capacitance of the further capacitor 708 and the resistance of the resistor 710 determine the time constant of the envelope detector 704. The envelope detector 704 provides an output that corresponds to the amplitude of the received signal, that can be used by further detection electronics (not shown) to determine whether a skew condition has occurred. Use of the unity-gain buffer advantageously provides a high impedance output for further detection electronics, while ensuring the signal detector 700 presents a low impedance to the one or more control surface element signal transmission units.

Preferably the signal detector 700 further includes further detection electronics (not shown) connected to the unity-gain buffer 712. In some embodiments, the further detection electronics includes an amplitude detector configured to compare the amplitude of the output from the envelope detector 704 to a threshold amplitude for determining whether a skew condition is present.

In some embodiments, in addition to the envelope detector 704, a phase detector (for example an analogue phase comparator or a microprocessor configured to determine the phase of the received signal) is provided in addition to the envelope detector 704. In this case, the phase detector compares the phase of the monitoring signal as received at the signal receiver coil 701 to the phase of the monitoring signal at the signal transmitter coil 412, to determine whether a phase shift indicative of a skew condition is present.

Figure 8:
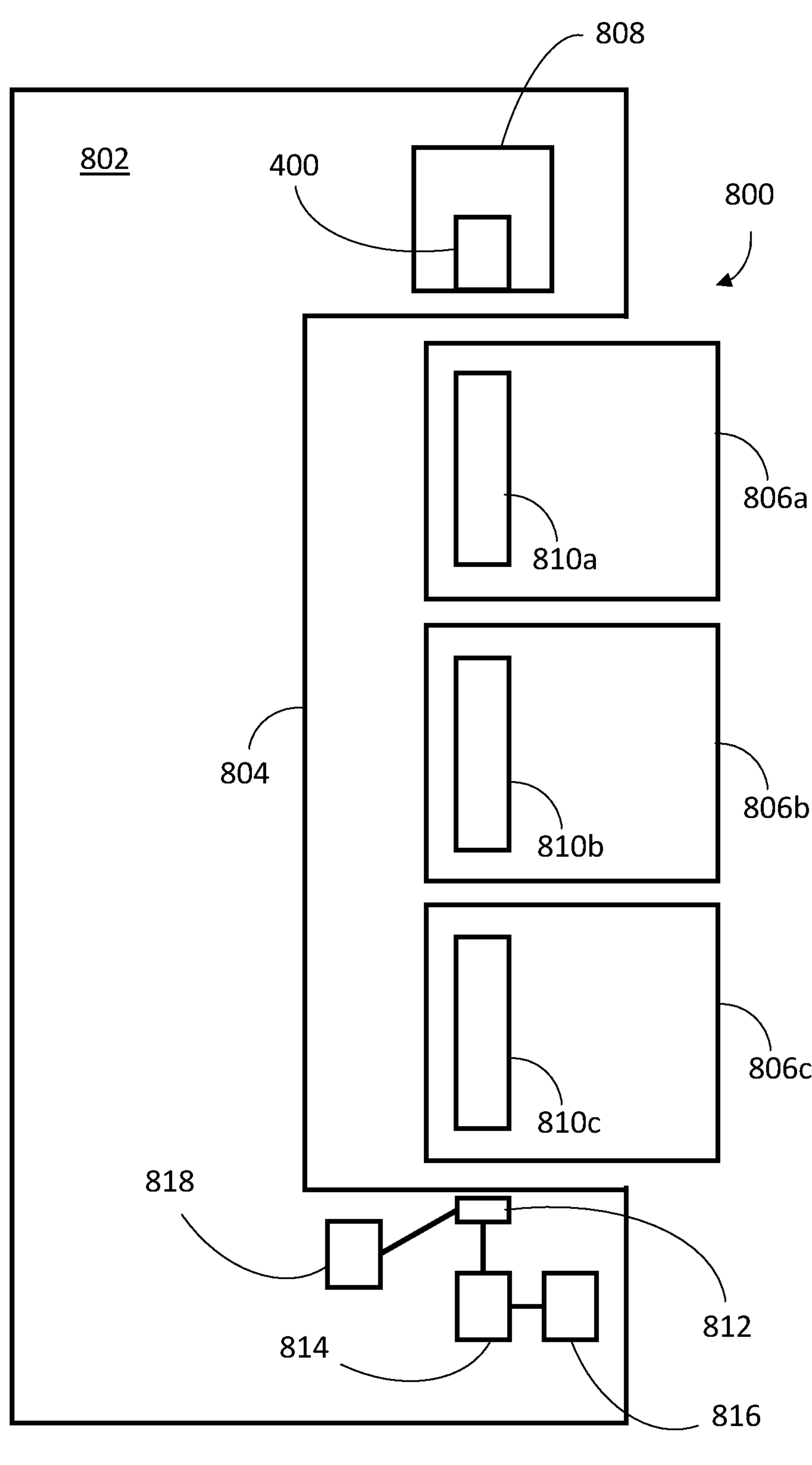
FIG. 8 shows a schematic representation of an aircraft moveable element monitoring system implemented on an aircraft wing in accordance with an embodiment of the present invention.

FIG. 8 shows a schematic representation of an aircraft moveable element monitoring system 800 implemented on an aircraft wing 802 in accordance with an embodiment of the present invention. The aircraft wing 802 comprises a fixed part 804 and one or more moveable elements 806*a*, 806*b*, 806*c*. The one or more moveable elements may be high lift devices such as slats, flaps, Krueger Flaps, or other moveable elements. The moveable elements 806*a*, 806*b*, 806*c* are shown in an extended position in FIG. 8, and in normal operation are moved in unison between retracted and extended positions.

The aircraft moveable element monitoring system 800 comprises a signal transmitter apparatus 808 that includes the signal transmitter circuit 400 described above in relation to FIG. 4A. Preferably, the signal transmitter apparatus 808 is the signal transmitter apparatus 500 described above in relation to FIGS. 5A and 5B.

The aircraft moveable element monitoring system 800 also comprises one or more moveable element signal transmission units 810*a*, 810*b*, 810*c*, each disposed in/on a corresponding moveable element 806*a*, 806*b*, 806*c*. Preferably, each moveable element signal transmission unit 810*a*, 810*b*, 810*c* is a moveable element signal transmission unit 615 as described above in relation to FIG. 6.

The aircraft moveable element monitoring system 800 also comprises a signal receiver coil 812 (preferably the signal receiver coil 701 described above in relation to FIG. 7), and a signal detector 814 (preferably the signal detector 700 described above in relation to FIG. 7). The signal detector 814 preferably includes an amplitude threshold detector configured to compare the amplitude of the received monitoring signal to a threshold and thereby determine whether at least one of the moveable elements 806*a*, 806*b*, 806*c* is in a skew condition. Optionally, a phase detector 818 is provided in communication with the signal receiver coil 812 (for example an analogue phase comparator or a microprocessor configured to determine the phase of the received monitoring signal) configured to determine a phase difference between the monitoring signal as received by the signal receiver coil 812 and the monitoring signal as transmitted at the signal transmitter circuit 400, thereby determining whether a phase difference corresponding to at least one of the moveable element 806*a*, 806*b*, 806*c* being in a skew condition is present.

In an alternative embodiment, the signal detector 814 may be the signal detector 700 described above in relation to FIG. 7, and the signal transmitter apparatus 808 may be different to the signal transmitter circuit 400 described above in relation to FIG. 4A, for example including a signal generator 108 electrically connected to a signal transmitter coil 110 as described in relation to FIGS. 1 and 2 above.

Whilst the presently disclosed subject matter is described in relation to embodiments for monitoring the condition control surface elements, the present disclosure can equally be applied to other movable/actuable aircraft components, wherein a signal transmission unit comprising first and second transmission unit coils are provided for each movable/actuable component, and are used to carry an electrical signal from a signal generator and transmitter coil to a signal receiver coil and detector using the principles set out above. For example, the movable/actuable component may be a door or sequence of doors.

One or more features of the embodiments described above may be combined to create additional embodiments which are not depicted. While various embodiments of the presently disclosed subject matter have been described above, it should be understood that they have been present by way of example, and not limitation. It will be apparent to persons skilled in the relevant arts that the disclosed subject matter may be embodied in other specific forms, variations, and modifications without departing from the scope of the appended independent claims. The presently disclosed embodiments are therefore to be considered in all respects as illustrative and not restrictive. The present invention covers all equivalents falling within the scope of the appended independent claims.

What is claimed is:

1. An aircraft moveable element monitoring system comprising:
- a monitoring signal generator;
- a monitoring signal transmitter coil electrically connected to the monitoring signal generator;
- a monitoring signal detector;
- a monitoring signal receiver coil electrically connected to the monitoring signal detector; and
- one or more moveable element signal transmission units;
- wherein the monitoring signal detector comprises a first capacitor and an envelope detector, and wherein the first capacitor and the envelope detector are each electrically connected in parallel to the monitoring signal receiver coil;
- wherein each moveable element signal transmission unit comprises a first signal transmission unit coil and a second signal transmission unit coil, the first signal transmission unit coil being electrically connected to the second signal transmission unit coil; and
- wherein each moveable element signal transmission unit is configured to be installed on a respective moveable element of an aircraft, such that the monitoring signal transmitter coil, the one or more moveable element signal transmission units, and the monitoring signal receiver coil form an inductively coupled transmission line.

2. The aircraft moveable element monitoring system of claim 1, wherein the envelope detector further comprises a unity-gain buffer.

3. An aircraft comprising the aircraft moveable element monitoring system of claim 2 and having one or more movable elements, wherein each of the one or more moveable element signal transmission units is installed on a respective one of the one or more movable elements.

4. The aircraft moveable element monitoring system of claim 1, wherein the monitoring signal detector further comprises:
- an analogue phase comparator configured to measure a phase difference between a time varying voltage signal and a received signal received by the monitoring signal detector via the monitoring signal receiver coil; or
- a microprocessor configured to measure a phase difference between the time varying voltage signal and a received signal received by the monitoring signal detector via the monitoring signal receiver coil.

5. An aircraft comprising the aircraft moveable element monitoring system of claim 4 and having one or more movable elements, wherein each of the one or more moveable element signal transmission units is installed on a respective one of the one or more movable elements.

6. The aircraft moveable element monitoring system of claim 1, wherein each moveable element signal transmission unit further comprises a tuning capacitor.

7. An aircraft comprising the aircraft moveable element monitoring system of claim 6 and having one or more movable elements, wherein each of the one or more moveable element signal transmission units is installed on a respective one of the one or more movable elements.

8. An aircraft comprising the aircraft moveable element monitoring system of claim 1 and having one or more movable elements, wherein each of the one or more moveable element signal transmission units is installed on a respective one of the one or more movable elements.

9. The aircraft moveable element monitoring system of claim 1, further comprising a monitoring signal transmitter circuit comprising:

a first electrical path between a voltage input and a first node, the first electrical path comprising an inductor;

a second electrical path between the first node and a second node, the second electrical path comprising a monitoring signal transmitter coil and a second capacitor, wherein the monitoring signal transmitter coil is electrically connected in series with the second capacitor;

a third electrical path between the first node and the second node, the third electrical path comprising a third capacitor, such that the third capacitor is electrically connected in parallel to the monitoring signal transmitter coil and the second capacitor; and a fourth electrical path between the second node and the voltage input.

10. The aircraft moveable element monitoring system of claim 9, wherein the monitoring signal generator comprises:

a connection to an aircraft DC voltage supply;

an H-bridge configured to controllably connect the connection to the aircraft DC voltage supply to the voltage input; and an H-bridge driver circuit configured to control the H-bridge so as to provide a time varying voltage signal to the voltage input.

11. The aircraft moveable element monitoring system of claim 10, wherein the H-bridge driver circuit is configured to control the H-bridge to selectively connect the connection to the aircraft DC voltage supply to the voltage input such that the varying voltage signal is a substantially square wave voltage signal.

12. The aircraft moveable element monitoring system of claim 11, wherein the angular frequency, ω, of the substantially square wave voltage signal satisfies the conditions $$\omega = \sqrt{\frac{1}{L_1 C_1}} \text{ and } \omega = \sqrt{\frac{1}{L_P}\left(\frac{1}{C_1} + \frac{1}{C_2}\right)},$$

where $L_1$ is the inductance of the inductor, $L_P$ is the inductance of the signal transmitter coil (412), $C_1$ is the capacitance of the third capacitor, and $C_2$ is the capacitance of the second capacitor.

* * * * *